UNITED STATES PATENT OFFICE.

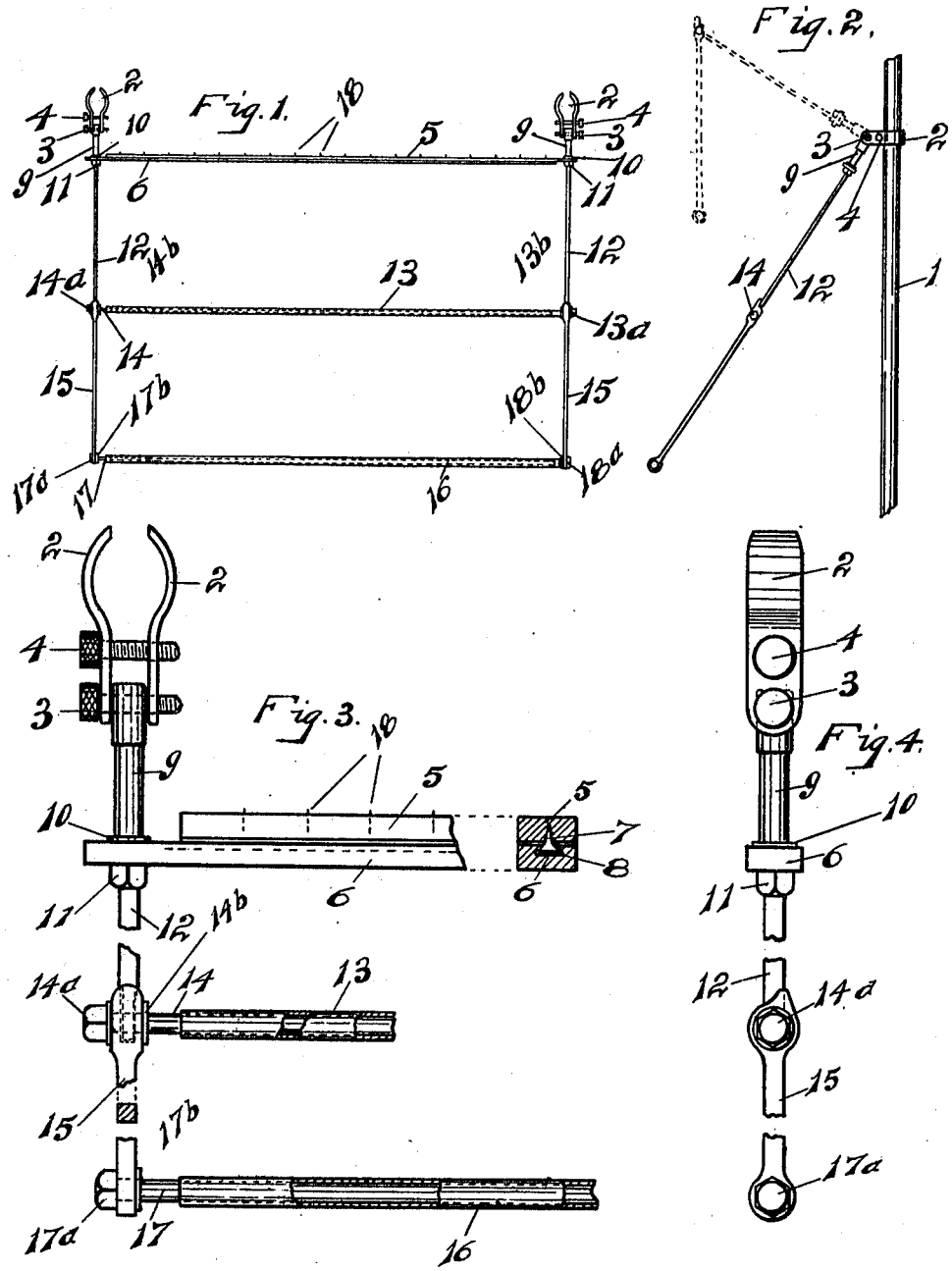

MATTIE F. FRAKES, OF PORTLAND, OREGON.

DEVICE FOR HOLDING PILLOW-SHAMS.

978,148.     Specification of Letters Patent.     Patented Dec. 13, 1910.

Application filed February 2, 1910. Serial No. 541,517.

*To all whom it may concern:*

Be it known that I, MATTIE F. FRAKES, a citizen of the United States, residing at Portland, in the county of Multnomah and State of Oregon, have invented a new and useful Improvement in Devices for Holding Pillow-Shams, of which the following is a specification.

My invention consists primarily of clamps, one set on each side of the bed which clamp the bed posts, thereby, holding the device at any desired height and also at the same time clamping the side bars to hold them at any desired angle, two side bars to which are attached cross telescoping members, and on the upper side of one of these bars, a series of pins over which the pillow sham may be hung, thereby holding the shams secure in the position desired.

The primary object to be accomplished is to display the shams to the best advantage in the day time and at night to raise them out of the way without removing them from their holder. I attain these objects by the mechanism illustrated in the accompanying drawing, in which—

Figure 1 is a front elevation of the device in its extended position; Fig. 2 is a side elevation of the pillow sham holder in position on the bed; in the full line drawing it is in the extended position, whereas in the dotted line position it is out of the way; Fig. 3 is an enlarged detail front elevation similar to that of Fig. 1 except that it is shown in detail; Fig. 4 is a detail side elevation of mechanism shown in Fig. 3.

Similar letters refer to similar parts throughout the several views.

1 is the bed post to which clamp 2 is secured, thereby holding the device at any desired height thereon; this clamp is pivoted about set screw 3 thereby permitting of the raising and lowering of the device. 4 is another set screw passing through the clamp and is for the purpose of locking the device in any desired position.

5 and 6 are the cross bars on the upper side having a screw 7 secured to 5 and operating in slot 8 in the bar 6; the object being to make the device adjustable to any size or width of bed.

9 is the upper end of the side of the device pivoted about set screw 3 and having a collar as shown at 10; when cross bars 5 and 6 are put in place upon these side bars nut 11 is put in place, thereby clamping 5 and 6 in their respective positions. 12 is a smaller section of these upper side bars. 13 and 14 are also cross bars passing through the side bars and having screwed on their outer end nuts $13^a$ and $14^a$; these cross bars also have collars on their inner side $13^b$ and $14^b$ to hold these bars also in their respective positions. The lower sections 15 are connected by the cross bars 16 and 17 passing therethrough and telescoping; these cross bars have collars near their outer ends and pass through lower side bar 15 and terminating with nuts $17^a$ and $18^a$ on their outer ends.

I am aware that prior to my invention pillow sham holders have been used and I do not claim my invention broadly, but I do claim—

In a device of the class described, the combination with adjustable post clamps, of stub rods pivotally connected thereto and independently detachable therefrom, said stub rods having collars formed adjacent the lower terminals thereof, jointed side rods detachably secured to said stub rods, an adjustable upper horizontal bar clamped between said collars and the side bars, formed of a plurality of bars having slidable dovetailed connections, a lower adjustable horizontal bar interposed between the lower terminals of the side rods, an intermediate adjustable horizontal bar interposed between the joints of the said side rods and forming pivots thereof, and stops carried by the lower sections of said side rods adapted to bear against the upper sections thereof when the device is in its operative position.

In testimony that I claim the foregoing as my own, I hereunto attach my signature in the presence of two witnesses.

MATTIE F. FRAKES.

Witnesses:
   JOSEPH A. FRAKES,
   ARTHUR R. BARNETT.